Jan. 23, 1962   H. HEPPLER ET AL   3,017,749
TEMPERATURE RESPONSIVE GAS TURBINE FUEL
CONTROL WITH MULTI-RATE FEEDBACK
Filed June 10, 1957

INVENTORS
HERBERT HEPPLER
PAUL M. STIGLIC
BY
ATTORNEYS

United States Patent Office 3,017,749
Patented Jan. 23, 1962

1

3,017,749
TEMPERATURE RESPONSIVE GAS TURBINE FUEL CONTROL WITH MULTI-RATE FEEDBACK
Herbert Heppler, 10469 Deborah Drive, Parma, Ohio, and Paul M. Stiglic, 17400 Woodford Ave., Lakewood, Ohio
Filed June 10, 1957, Ser. No. 664,861
4 Claims. (Cl. 60—39.28)
(Granted under Title 35, U.S. Code (1952), sec. 266)

The invention described herein may be manufactured and used by or for the Government of the United States of America for governmental purposes without the payment of any royalties thereon or therefor.

The present invention relates to controls for aircraft engines and more particularly to a control system that will automatically take corrective action to recover a gas-turbine engine from a stall or surge condition.

During operation of a gas-turbine engine, special precaution must be taken so as not to overaccelerate, as a stall or surge condition might result. Heretofore there have been several methods employed in attempts to prevent or correct a stall or surge condition. One method heretofore employed consisted in having a temperature override system that would limit the turbine temperatures to a scheduled value. However, this method had the disadvantage of being slow acting and furthermore did not recover the engine from surge or stall but merely limited the temperature of the turbine.

Another method employed in the past consisted in attempting to avoid conditions of stall or surge by using a conservative acceleration schedule. However, this method called for the engine to accelerate slowly which might create a dangerous condition as in the case of a "wave-off" on a aircraft attempting a landing on a carrier. Also, in the event of surge or stall no corrective action was taken and the engine was allowed to operate under the highly destructive conditions of stall or surge and thus often resulting in turbine failure.

Another control system, heretofore employed in the past, attempted to deal with stall and surge by comparing compressor discharge pressure with a schedule generated within the control, thereby detecting stall or surge conditions. Upon detection of a stall or surge condition the control would cut back fuel flow in order to effect a recovery. However, upon a recovery being effected, the fuel flow would be increased immediately whereupon repeated stalls or surges would be encountered. Also, as the schedule generated within the control was a function of two or more engine variables, the control mechanism was very complicated.

The present invention provides a novel means of detecting and preventing stall or surge conditions by sensing temperature directly instead of pressure. This is of particular advantage for if the engine does not immediately recover from stall or surge, fuel intake to the engine will be further reduced until the temperature within the turbine is reduced to its preset limit. Temperature is sensed by means of a thermocouple which, when used in conjunction with a temperature sensor compensator, results in a temperature sensing circuit free of dynamics. An electronic computer is provided to compare the measured temperature value with a present temperature value and upon detection of a stall or surge condition the computer provides a current that opens a bypass valve that reduces fuel flow to the engine. After the engine recovers from stall or surge the computer operates to close the bypass valve slowly in order to avoid repeated stalls or surges. After

2 the bypass valve is closed, a standard engine control is again in complete control of the engine.

It is therefore an object of the present invention to detect stall or surge conditions in a turbine engine and to take corrective action in order to prevent damage to the engine.

Another object of the present invention is to prevent stall or surge damage in a turbine engine by rapidly reducing fuel flow to an engine upon detection of a stall or surge condition and then to slowly increase fuel flow so as to avoid additional stall or surge conditions.

Other objects and advantages of the present invention will be more readily understood by reference to the following detailed description when considered in connection with the accompanying drawing wherein.

Figure 1:
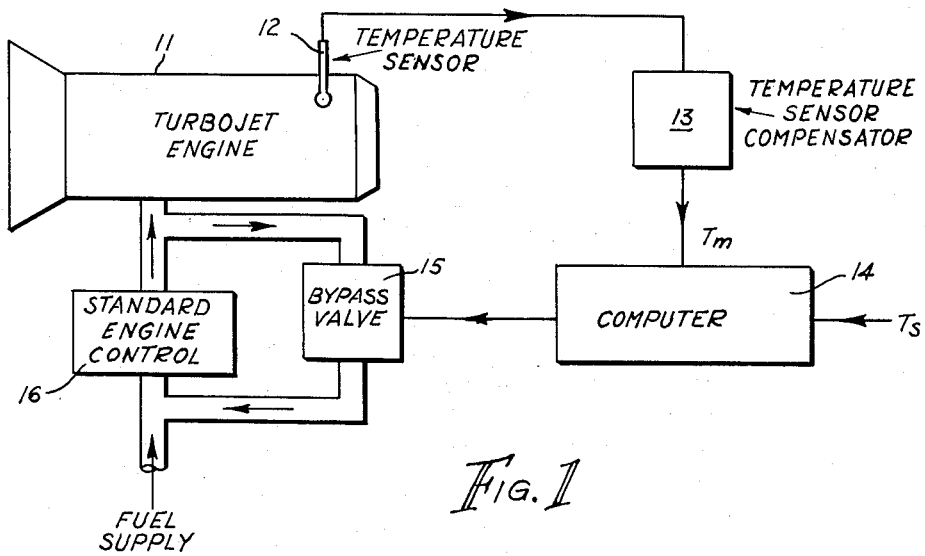
FIG. 1 is a diagram showing the components of the present invention.

Referring now to FIG. 1 of the drawing, there is shown a turbojet engine 11, which may be of any well known type, that utilizes a compressor for providing air under pressure to a fuel combustion chamber. The products of combustion rotatably drive a turbine, which in turn drives the compressor. The engine might be either the power jet type or the turbine power may be utilized to drive a propeller, as in the case of a turbo-prop engine. A temperature sensor 12, such as a thermocouple, is provided in the tail-pipe portion of the engine 11 and will indicate any radical change in temperature, such as that accompanied by a stall or surge condition.

Figure 2:
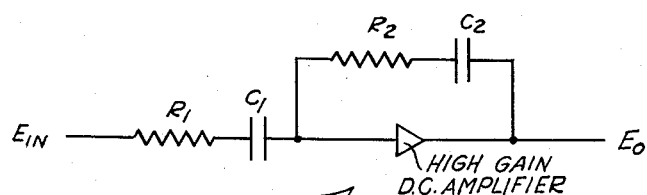
FIG. 2 is a circuit diagram of a temperature sensor compensator.

A temperature sensor compensator 13 is employed in order to overcome the slow response normally associated with a temperature sensor. By way of example, the temperature sensor compensator 13 might be an analog computer with a circuit such as that shown in FIG. 2 of the drawing. This circuit would have a transfer function of $$\frac{E_0}{E_{in}} = -\frac{C_1}{C_2} \frac{1+R_2C_2S}{1+R_1C_1S}$$

where S is Laplacian operator.

By making $R_2C_2$ equal to the time constant of the thermocouple and $R_1C_1$ as small as possible, the result will be a fast responding temperature signal.

Figure 3:
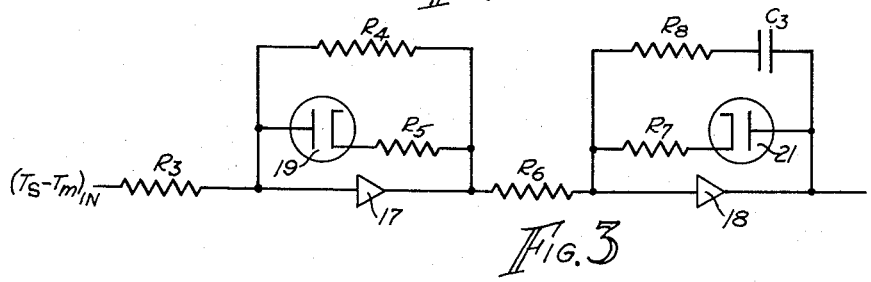
FIG. 3 is a circuit diagram of a computer used in the present invention.

The measured engine temperature value, $T_m$, is fed into a computer 14 that, by way of example, might be electronic in nature, as shown in FIG. 3 of the drawing. Within computer 14, the measured engine temperature $T_m$ is compared with a preset temperature value $T_s$, and if $T_m$ is greater than $T_s$, indicating a stall condition, the computer reacts to provide an output signal that will quickly open a bypass valve 15. The opening of bypass valve 15, as shown in FIG. 1 of the drawing, reduces fuel flow to the engine and consequently the engine temperature $T_m$ is lowered. When the engine 11 recovers from stall, the engine temperature, $T_m$, is lowered to a value below the value of the preset temperature, $T_s$, and the computer 14 then provides a signal that slowly closes the bypass valve 15 in order to avoid repeated stalls or surges. When the bypass valve 15 is closed, the standard engine control 16 is again in complete control of the engine 11.

Referring now to FIG. 3 of the drawing, there is shown, by way of example, one type of computer 14 that may be employed to control the bypass valve 15. The value of the difference between the measured temperature, $T_m$, and the preset temperature, $T_s$, is fed into amplifier 17, which can have two transfer functions, namely:

$$K_1 = -\frac{R_4}{R_3}$$

if $(T_s - T_m)$ is negative; and $$K_2 = -\frac{R_4 R_5}{R_3(R_4 + R_5)}$$

if $(T_s - T_m)$ is positive.

In operation $K_1$ is very much larger than $K_2$. Amplifier 18 can also have two transfer functions, namely:

$$K_3 \approx -\frac{R_7}{R_6}$$

if the output of amplifier 18 is positive; and $$K_4 = \frac{R_8}{R_6}\left(1 + \frac{1}{R_8 C_3 S}\right)$$

when the output of amplifier 18 is negative.

When stall is encountered during operation of the engine 11, the measured temperature, $T_m$, is larger than the preset temperature, $T_s$, and, accordingly, $(T_s - T_m)$ is negative. Accordingly, the amplifier 17 has the transfer function $K_1$ which results in a high positive signal being fed into amplifier 18. This positive signal being fed into amplifier 18 makes its output turn negative, thus giving it transfer function $K_4$. The output of amplifier 18 increases, in a negative direction, very rapidly as long as $(T_s - T_m)$ is negative, and this signal is used to open rapidly the bypass valve 15 and thus provide a rapid reduction of fuel flow into the engine 11.

When the engine recovers from the stall condition, $(T_s - T_m)$ becomes positive, and amplifier 17 will then have transfer function $K_2$, due to the conducting of diode 19. This feeds a low level negative signal to amplifier 18. Amplifier 18, which has a large negative output because it has been integrating its input, will receive the low level negative signal, but the output will not change signs. Amplifier 18 will now integrate its input in the other direction in order to bring its output back to zero and as it is being fed a low level negative signal its output will return to zero at a slower rate than it increased. Thus the bypass valve 15 will be closed slowly and will prevent the occurrence of additional stalls that might normally take place with too great a fuel flow.

When the output of amplifier 18 returns to zero, diode 21 switches, thus giving amplifier 18 the gain $K_3$. This gain is extremely small and thus there is very little output of the computer during normal engine operation, and the bypass valve 15 remains closed.

It can thus be seen that a gas turbine engine equipped with the present invention could successfully complete accelerations during which stall or surge are encountered, while in all heretofore known systems the pilot or operator must reduce fuel flow and reattempt the acceleration. The present invention can, by adjusting the preset value temperature, $T_s$, anticipate a stall or surge condition and take corrective action before the actual stall takes place. Likewise, by providing a system for rapidly opening a bypass valve, the stall or surge condition is corrected before destructive damage occurs to the engine, and by providing means for slowly closing the bypass valve, repeated stalls and surges are prevented.

It should be understood, of course, that various modifications of the present invention are possible in the light of the above teachings. It is therefore to be understood that the invention may be practiced otherwise than as specifically described.

What is claimed is:

1. A control system for correcting a stall condition in a gas turbine engine having a fuel line connected thereto comprising, temperature responsive means operably connected to said gas turbine engine for measuring internal gas temperatures, a computing means responsive to measurements derived by said temperature responsive means for comparing the value of the temperature to be measured with a preset temperature value to provide a temperature difference value, means responsive to said temperature difference value for providing an output signal that increases rapidly in one direction when the value of said temperature to be measured exceeds the value of said preset temperature and means responsive to said temperature difference value for providing an output which decreases slowly to zero after the value of said temperature to be measured is reduced below the value of said preset temperature and means responsive to said output signal for reducing the fuel flow in said fuel line as a direct function of said output signal in said one direction and increasing the fuel flow as a direct function of said output signal in the opposite to said one direction.

2. A control system for correcting a stall condition in a gas turbine engine having a fuel line connected thereto comprising, temperature responsive means operably connected to said gas turbine engine for measuring internal gas temperatures, a first means connected with said temperature responsive means for increasing the rate of response of said temperature responsive means, said first means including a direct current amplifier connected in series with a first resistance and a first capacitance and a second resistance and a second capacitance being connected in parallel with said amplifier wherein the time constant of said second resistance and said second capacitance as a unit is substantially equal to that of said temperature responsive means, and the time constant of said first resistance and first capacitance as a unit is substantially shorter than said first named time constant, a computer operably connected with said first means for comparing the value of the temperature to be measured with a preset temperature value whereby said computer provides an output signal that increases rapidly in one direction when the value of said temperature to be measured exceeds the value of said preset temperature and decreases slowly to zero after the value of said temperature to be measured is reduced below the value of said preset temperature, and means responsive to said output signal for reducing the fuel flow in said fuel line as a direct function of said output signal in said one direction.

3. The control system defined in claim 2 in which said pre-set temperature is represented by a voltage of a fixed value of a first polarity, the output of said temperature responsive means as modified by said first means is represented by a voltage of opposite polarity, said computer comprising a first computing elment and a following second computing element each comprising an amplifier, a diode being connected in a first series path between the input and output of each amplifier, each of said diodes being poled to conduct in response to an input signal to said computer corresponding in polarity to said first polarity, resistance and capacitance being connected in a second series path between the input and output of said second amplifier.

4. A control system for correcting a stall condition in a gas turbine engine having a fuel line connected thereto comprising, a temperature responsive means operably connected to said gas turbine engine for measuring internal gas temperatures, compensating means connected with said temperature responsive means for increasing the rate of response of said temperature responsive means, said compensating means comprising a first signal processing means responsive to a measurement response from said temperature responsive means for subjecting said response to a short time constant effect and a second signal processing means responsive to the output of said first signal processing means for subjecting said output to a time constant substantially equal to that of said temperature responsive means, said short time constant effect being substantially shorter than the time consant of said temperature responsive means, a computer operably connected with said compensation means for comparing the value of the temperature to be measured with a preset temperature value whereby said computer provides an output signal that increases rapidly in one direction when the value of said temperature to be measured exceeds the value of said preset temperature and decreases slowly to zero after the value of said temperature to be measured is reduced below the value of said preset temperature, and means responsive to said output signal for reducing the fuel flow in said fuel line as a direct function of said output signal in said one direction.

References Cited in the file of this patent

UNITED STATES PATENTS

| | | |
|---|---|---|
| 1,844,177 | Posthumus | Feb. 9, 1932 |
| 2,224,699 | Rust | Dec. 10, 1940 |
| 2,567,892 | Osterman | Sept. 11, 1951 |
| 2,573,596 | Offner | Oct. 30, 1951 |
| 2,634,579 | Reynolds et al. | Apr. 14, 1953 |
| 2,690,647 | Woodward | Oct. 5, 1954 |
| 2,698,717 | Sisco | Jan. 4, 1955 |
| 2,700,275 | Chandler et al. | Jan. 25, 1955 |
| 2,734,340 | Wood | Feb. 14, 1956 |
| 2,772,378 | Farkas | Nov. 27, 1956 |
| 2,832,017 | Evans | Apr. 22, 1958 |
| 2,885,612 | Larsen | May 5, 1959 |
| 2,943,448 | Berggren | July 5, 1960 |
| 2,971,337 | Wintrode | Feb. 14, 1961 |

FOREIGN PATENTS

| | | |
|---|---|---|
| 682,049 | Great Britain | Nov. 5, 1952 |

OTHER REFERENCES

Shepard et al.: Instruments Magazine, Nov. 1953, pgs. 1725–1727.